(12) United States Patent
Kao et al.

(10) Patent No.: US 10,360,170 B2
(45) Date of Patent: Jul. 23, 2019

(54) SYSTEM, APPARATUS AND METHOD FOR WIRELESSLY EXPANDING SERIAL COMMUNICATION PORT BETWEEN ELECTRONIC COMPUTING DEVICE AND ITS PERIPHERAL DEVICE

(71) Applicant: ATEN International Co., Ltd., New Taipei (TW)

(72) Inventors: Kuo-Feng Kao, New Taipei (TW); Li-Jen Chang, New Taipei (TW); Hsiang-Jui Yu, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 9 days.

(21) Appl. No.: 15/668,533

(22) Filed: Aug. 3, 2017

(65) Prior Publication Data

US 2018/0039595 A1    Feb. 8, 2018

(30) Foreign Application Priority Data

Aug. 5, 2016 (TW) ............................. 105125026 A

(51) Int. Cl.
  *G06F 13/42* (2006.01)
  *G06F 13/38* (2006.01)
  *H04W 74/00* (2009.01)

(52) U.S. Cl.
  CPC ........ *G06F 13/4226* (2013.01); *G06F 13/385* (2013.01); *G06F 13/387* (2013.01); *G06F 13/4282* (2013.01); *H04W 74/004* (2013.01)

(58) Field of Classification Search
  USPC ...................... 710/71–73, 305–307
  See application file for complete search history.

(56) References Cited

U.S. PATENT DOCUMENTS

| | | | |
|---|---|---|---|
| 8,671,235 B2* | 3/2014 | Tung ...................... | G06F 3/023 710/305 |
| 2001/0047441 A1* | 11/2001 | Robertson ............. | G06F 13/385 710/65 |
| 2009/0303926 A1* | 12/2009 | Den Hartog ........ | H04L 12/2809 370/328 |
| 2011/0063211 A1* | 3/2011 | Hoerl ..................... | H04L 41/04 345/157 |

FOREIGN PATENT DOCUMENTS

CN            201854280 U    6/2011

* cited by examiner

*Primary Examiner* — Raymond N Phan
(74) *Attorney, Agent, or Firm* — Chen Yoshimura LLP

(57) ABSTRACT

The present invention provides an apparatus for expanding a serial communication port. The apparatus includes a first serial port, a second serial port and a processing and control module. The first serial port is used to transmit a first signal, and the second serial port is used to transmit a second signal. The processing and control module is coupled between the first serial port and the second serial port. The processing and control module includes a first serial bus host controller, a second serial bus host controller, a data forwarding unit and an expansion unit. The apparatus is connected between an electronic device and multiple peripheral devices, so that via the expansion unit, each peripheral device generates its own communication port on the electronic device.

19 Claims, 5 Drawing Sheets

SYSTEM, APPARATUS AND METHOD FOR WIRELESSLY EXPANDING SERIAL COMMUNICATION PORT BETWEEN ELECTRONIC COMPUTING DEVICE AND ITS PERIPHERAL DEVICE

BACKGROUND OF THE INVENTION

Field of the Invention

This invention relates to an apparatus and related method for expanding serial communication ports, in particular, it relates to an apparatus and related method for wirelessly expanding serial communication ports.

Description of Related Art

Nowadays many industrial electronic apparatus are controlled remotely by computers to save manpower, improve productivity, and achieve stable yield and quality. Earlier industrial electronic apparatus use wired transmission interfaces to transmit data and communicate with each other. However, in such systems, the transmission distance is limited by the lengths of the wires, which also causes inconveniences in physical configurations.

Many relevant industry associations and groups have developed may communication protocols and various transmission interfaces for various application fields, so that conforming hardware and software can be developed in various industries, such as serial communication and parallel communication. These different communication protocols have their advantages and disadvantages and their applicable fields. Generally speaking, serial communication devices have a simpler structure than parallel communication devices, and have smaller physical sizes, while parallel communication devices requires arrays for transmission lines. Thus, in computing devices, the CPUs (Central Processing Units), graphic processors, data storage and data transmission hardware typically use parallel communication, while industrial electronic apparatus and computer peripheral devices typically use serial communication. Serial communication interfaces include I²C (Inter-Integrated Circuit) interface, USB (Universal Serial Bus) interface, universal asynchronous transfer interface, RS-485 and RS-232 interfaces, etc. Parallel communication interfaces include ISA (Industry Standard Architecture), IDE (Integrated Drive Electronics), PCI (Peripheral Component Interconnect), and SATA (Serial AT Attachment) interfaces, etc.

UART (Universal Asynchronous Receiver/Transmitter) is an early serial communication interface, mainly used in electronic apparatus for point to point transmission. USB has gradually replaced UART and become a commonly used serial bus, use in computer peripheral devices such as mouse and keyboard. Advantages of USB include hot pluggable, i.e. plug and play. For these reasons, USB has become an essential equipment for computer systems and is also widely used in portable electronic devices such as smart phones and tablet computers.

RS-232 interface, one of the widely used wired communication interfaces, is a serial communication interface standard formulated by the Electronic Industry Association (EIA), and is widely used for computer serial ports. In the RS-232 standard, a byte is transmitted as a series of bits in a serial manner; the advantage is that it requires fewer transmission lines, is convenient in wiring, and the transmission distance is relatively far. Serial communication requires using software to set transmission parameters, such as baud, which represents the number of bits per second (bit/sec) transmitted. Generally speaking, the two ends of the communication need to be set to the same baud, otherwise the transmission cannot proceed. Serial ports are also a general communication specification used by many types of instruments and meters; many GPIB (General Purpose Interface Bus) compatible equipment also has RS-232 ports. Serial port communication protocols may also be used to obtain data from remote data collection equipment. An advantage of serial ports is that it uses one wire to transmit data and another wire to receive data, thus having a simple structure, and can also achieve communication over a long distance.

Wireless communication has eliminated many shortcomings of wired communication and extended the transmission distances between industrial equipment and remote computers. There are many wireless communication methods today, such as WiFi, Bluetooth, Zigbee, etc. They each have their advantages and disadvantages and various limitations on their applications. Take Bluetooth as an example, the wireless transmission power ranges from 1 mW to 100 mW (0 to 20 dBm, Power Classes 3, 2, 1) with typical operating range of 1 to 100 meters. The implemented transmission power depends on the system requirement, but to reach 100 mW transmission power, a RF power amplifier (power amp) is needed to amplify the power. The transfer rate is theoretically 1 Mbps (bps=bit per second), but in practice the effective transfer rate is up to 721 kbps. It may reach 12 Mbps in the future.

In the case of Bluetooth transmitters with RS-232 port, for example a Bluetooth to serial adaptor model GBS301, some disadvantages of such devices include the inability to adjust the baud rate and data flow control. In the case of another known serial device server model SN3101, although it supports RS-232, RS-422 and RS-485 data transmission interfaces, and can also support Ethernet, its disadvantages include: the need to install specific software, the need to provide specific TCP/IP communication architecture, so the operation steps are complex and inconvenient.

The above-described USB, UART, RS-232 and wireless communication interfaces each has its own application areas, and electronic devices and instruments using different communication interfaces cannot be connected for data transmission using a simple physical connection, which limits the configuration of computers and industrial equipment and instruments. Therefore, there is a need for a conversion structure between serial communication and wireless communication, to integrate USB, wireless and UART systems, so as to not only provide fast connection setup, but also increase transmission speed and range.

SUMMARY

Accordingly, the present invention is directed to an apparatus and related method that substantially obviates one or more of the problems due to limitations and disadvantages of the related art. To achieve the above objects, the present invention provides a serial communication expansion device, which includes a first serial connection port, for transmitting a first signal; a second serial connection port, for transmitting a second signal; and a processing and control module, coupled between the first serial connection port and the second serial connection port, the processing and control module including: a first serial bus host controller, coupled to the first serial connection port; a second serial bus host controller, coupled to the second serial connection port; a data forwarding unit, coupled between the first and second serial bus host controllers, for converting between the first signal and the second signal; and an expansion unit, coupled between the first and second serial bus host controllers. The serial communication expansion device is coupled between an electronic device and multiple peripheral devices, wherein the multiple peripheral devices establish their respective communication ports on the electronic device via the expansion unit.

The serial communication expansion device may further include a wireless communication unit which includes a Bluetooth communication interface, wherein the first serial connection port includes a Universal Serial Bus (USB) interface, and the second serial connection port includes a Universal Asynchronous Receiver/Transmitter (UART) interface.

In another aspect, the present invention provides a serial communication expansion system, which includes: a local module, including: a first serial connection port coupled to an electronic device, and a first serial bus host controller for receiving a first signal from the electronic device; a data forwarding module, coupled to the local module, for converting the first signal to a second signal; an expansion module, coupled to the local module; a wireless communication module, coupled to the local module, for providing at least two signal channels; and a remote module, coupled to the local module, including a second serial connection port coupled to multiple peripheral devices, and a second serial bus host controller, for receiving the second signal and transmitting it to one of the multiple peripheral devices; wherein the multiple peripheral devices establish their respective communication ports on the electronic device via the expansion module.

The local module may include a USB interface for coupling to the electronic device, and the remote module may include a UART interface for coupling to the peripheral devices. The local module and the remote module may be connected to each other by an optical cable or a twisted pair cable.

In another aspect, the present invention provides a communication expansion system in an electronic device, the system including a virtual machine, which includes: a communication port driver interface; a communication port expansion unit, coupled to the communication port driver interface; a signal capture/forwarding unit, coupled to the communication port expansion unit; and a wireless communication unit, coupled to the signal capture/forwarding unit.

The communication expansion system may further include a signal transmitter, wherein the multiple peripheral devices are connected to the electronic device via the signal transmitter, and wherein the multiple peripheral devices establish their respective communication ports on the electronic device. The communication port driver interface may include a USB interface, and the wireless communication unit includes a Bluetooth communication interface.

In another aspect, the present invention provides a method for expanding serial communication between a local module and a remote module, wherein the local module is coupled to an electronic device and includes a first serial bus host controller, the remote module is coupled to multiple peripheral devices and includes a second serial bus host controller, the method including: the electronic device and the multiple peripheral devices perform enumeration via an expansion module, wherein each of the multiple peripheral devices establishes a respective communication port on the electronic device; the first serial bus host controller receiving a first signal from the electronic device; a data forwarding module coupled between the local module and the remote module converting the first signal to a second signal; a wireless communication unit providing at least two signal channels between the local module and the remote module; the second serial bus host controller receiving the second signal; and the remote module transmitting the second signal to one of the multiple peripheral devices.

One of the communication ports of the electronic device may generate the first signal and transmit it to the first serial bus host controller. The local module may be coupled to the electronic device by a USB interface, and the remote module may be coupled to the peripheral devices by UART interfaces. The wireless communication unit may include a Bluetooth communication interface.

Features and advantages of the invention can be understood by referring to the detailed description below and the drawings.

DETAILED DESCRIPTION OF PREFERRED EMBODIMENTS

Embodiments of the invention are described in detail below to facilitate understanding of the embodiments. Those skilled in the art will appreciate that the invention may also be implemented without some of the detailed structures. Further, some well known structures and functions are not described in detail. Moreover, terminology used in the descriptions below should be given their broadest reasonable interpretation even though they are used in the context of certain detailed descriptions.

Figure 1:
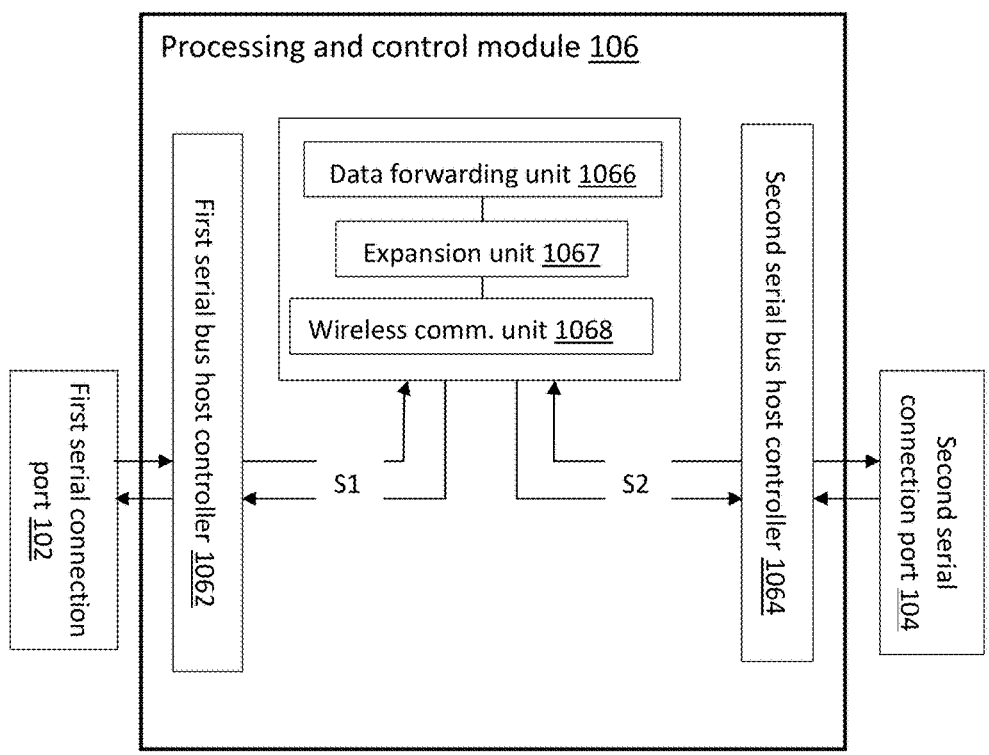
FIG. 1 is a block diagram showing a first embodiment of the present invention.

Refer to FIG. 1, which illustrates a serial communication expansion device 100 according to a first embodiment of the present invention. The device 100 includes a first serial connection port 102, a second serial connection port 104, and a processing and control module 106 coupled between the first serial connection port 102 and the second serial connection port 104. A purpose of this embodiment is: the device 100 may be used as signal transmission device between an electronic computing device and its peripheral device. More specifically, the device 100 may be function as a transmitter or a receiver; a transmitter can be coupled to the computing device and a receiver can be coupled to the peripheral device, and the transmitter and the receiver transmit data between them using an internal wireless communication unit 1068, as shown in FIG. 2, so that the peripheral devices can establish their respective communication ports on the computing device, as will be described in more detail below.

Referring to FIG. 1, the first serial connection port 102 is used to transmit a first signal S1, and the second serial connection port 104 is used to transmit a second signal S2. The processing and control module 106 includes a first serial bus host controller 1062, a second serial bus host controller 1064, a data forwarding unit 1066, an expansion unit 1067 and a wireless communication unit 1068. The data forwarding unit 1066 is coupled between the first serial bus host controller 1062 and the second serial bus host controller 1064, for converting between the first signal S1 and the second signal S2. The wireless communication unit 1068 provides at least two signal channels (not shown in the drawings) between the first serial bus host controller 1062 and the second serial bus host controller 1064, one for transmitting parameters and/or commands, such as HID control, and the other for transmitting data, such as HID data. In a preferred embodiment, the wireless communication unit 1068 may be a Bluetooth module, and the data forwarding unit 1066 may be a wired-to-wireless signal converter. The descriptions below use this preferred embodiment to explain the principles of the data forwarding unit 1066, the expansion unit 1067 and the wireless communication unit 1068.

In one example, the firs signal S1 is a serial digital signal, which is transmitted to the processing and control module 106 via the first serial connection port 102. More specifically, the first signal S1 is transmitted via the first serial connection port 102 and the first serial bus host controller 1062 to the data forwarding unit 1066, and is converted by the data forwarding unit 1066 into the second signal S2, which is a wireless signal and different from the serial digital signal. After the conversion, the second signal S2 is transmitted via the second serial bus host controller 1064 to the second serial connection port 104, and then transmitted to the corresponding peripheral device. It should be noted that the first signal S1 and the second signal S2 are not limited to the above mentioned serial digital signal and wireless signal, as long as they are different; the signal types of the first and second signals depend on the type of the connection ports.

Figure 2:
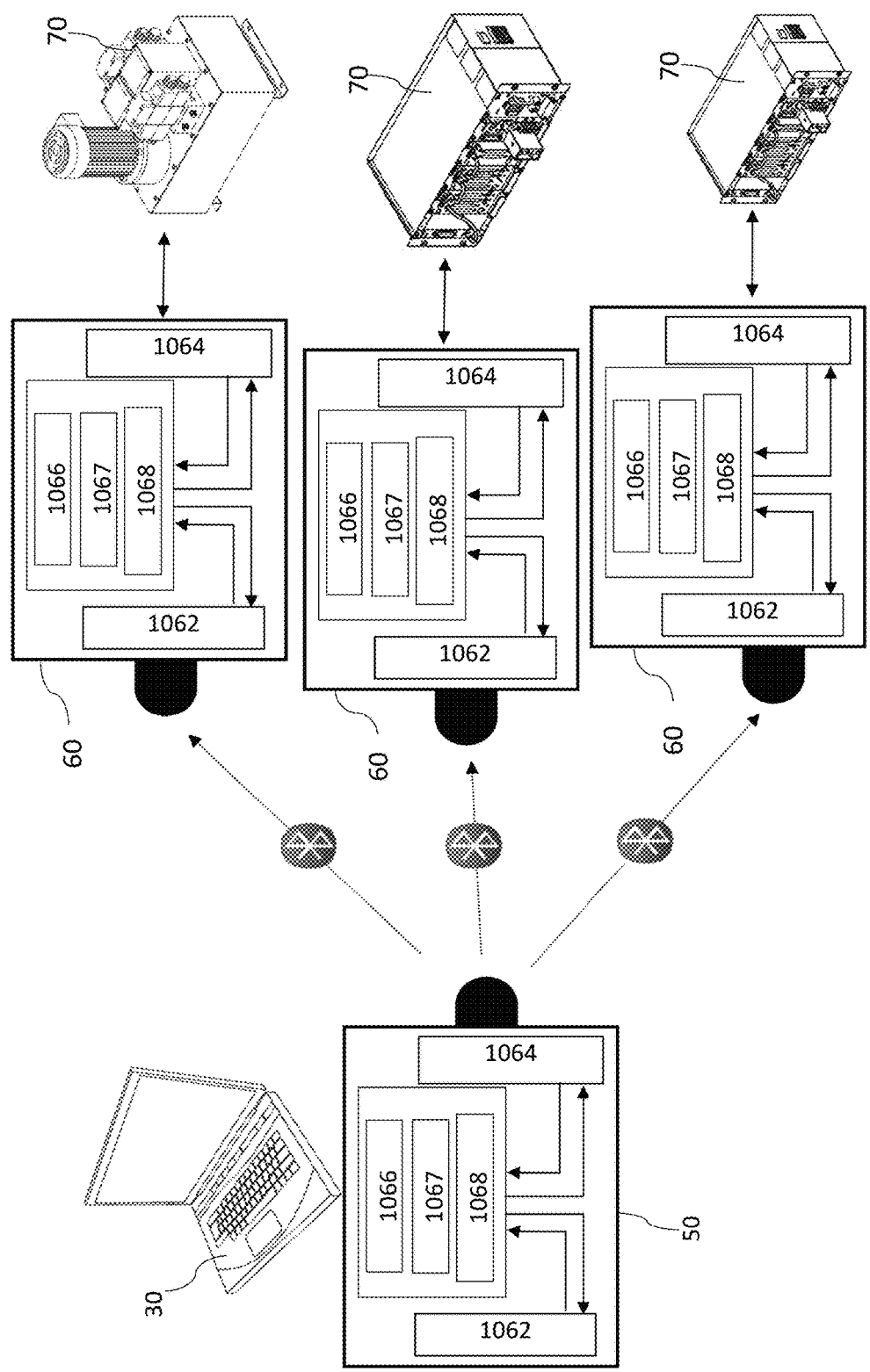
FIG. 2 illustrates a system configuration of the first embodiment.

In another example, referring to FIG. 2, which illustrates the data transmission flow between electronic device 30—transmitter 50—Bluetooth communication interface—receiver 60—peripheral device 70. A device 100 of FIG. 1 is coupled to the electronic device 30 as the transmitter 50, and the electronic device 30 and the transmitter 50 are connected via an USB interface. On the other hand, one device 100 of FIG. 1 is coupled to each peripheral device 70 as the receiver 60, and the peripheral device 70 and the receiver 60 are connected via an UART interface. The transmitter 50 and the receiver 60 are coupled via a communication interface. In this system, the electronic device 30 acts as a master and the peripheral device 70 acts as a slave. It should be understood that the communication interface between the transmitter 50 and the receiver 60 may be a wired or wireless communication interface; in the following embodiment, Bluetooth is used as an example.

The electronic device 30 and the peripheral devices 70 perform enumeration via the transmitter 50 and the receiver 60. Each peripheral device 70 establishes its communication port (COM port) on the electronic device 30 via the expansion unit 1067 of FIG. 1. The expansion unit 1067 has the function of a host controller, such as USB host controller, RS232 host controller, I2C host controller, etc. It cooperates with the peripheral devices 70 to establish the COM ports on the electronic device 30. Then, an operator sets the baud rate and other parameters using the electronic device; these parameters/commands may constitute the first signal S1. The transmitter 50 converts the first signal S1 to the second signal S2. For example and without limitation, the first signal S1 is a serial signal and the second signal S2 is a wireless signal. The second signal S2 is transmitted by the wireless communication unit 1068 of the transmitter 50 to the receiver 60; the receiver 60 converts the second signal S2 back to the first signal S1 to be received by the peripheral device 70. In short, each peripheral device 70, via the receiver 60 and transmitter 50, establishes its communication port on the electronic device 30, and the operator can use the electronic device 30 to set respective parameters for each communication port, to achieve remote control of multiple electronic equipment of peripheral devices.

Figure 3:
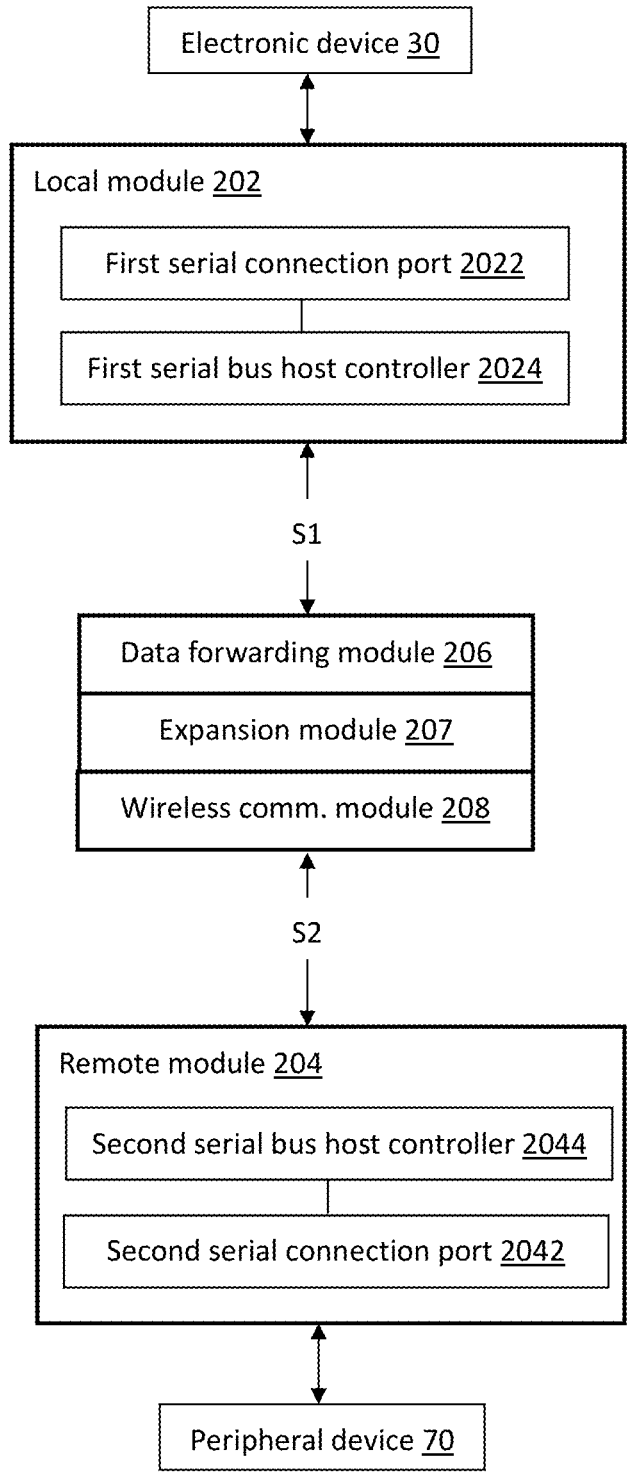
FIG. 3 is a block diagram showing a second embodiment of the present invention.

Refer to FIG. 3, which illustrates a serial communication expansion system architecture according to a second embodiment of the present invention. The system 200 includes a local module 202, a remote module 204, a data forwarding module 206, an expansion module 207 and a wireless communication module 208. The data forwarding module 206, expansion module 207 and wireless communication module 208 are coupled between the local module 202 and the remote module 204. This embodiment can allow multiple peripheral devices 70 to establish their respective communication ports on the electronic device 30 via the local module 202 and the remote module 204, as described in detail below.

In one embodiment, the local module 202 includes a first serial connection port 2022 and a first serial bus host controller 2024. The first serial connection port 2022 and the first serial bus host controller 2024 are stored in a processing and control module (not shown in the drawing) of the electronic device 30. The processing and control module includes a microcontroller unit (MCU); i.e., the first serial connection port 2022 and the first serial bus host controller 2024 are controlled by the MCU. The first serial connection port 2022 may be, for example, I$^2$C interface, USB interface, OTG (USB On-The-Go) interface, UART interface, RS-485 interface, RS-232 interface, etc. In a preferred embodiment, the first serial connection port 2022 is an USB interface, but it is not limited to such. Those skilled in the art will appreciate that, without departing from the spirit of the invention, the first serial connection port 2022 may be changed to a parallel communication port.

Figure 4:
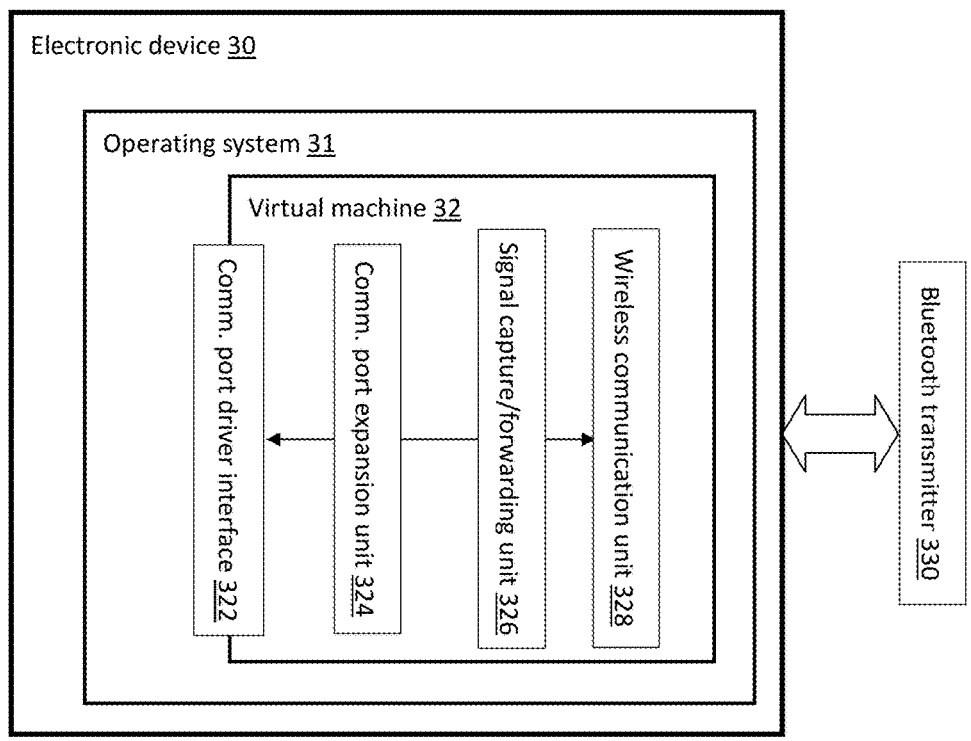
FIG. 4 is a block diagram showing a third embodiment of the present invention.

The first serial bus host controller 2024 is used to receive the first signal of the electronic device 30. The first serial bus host controller 2024 includes a USB host controller. In another embodiment, the electronic device 30 further includes a computer useable medium; for example, the electronic device 30 may include a virtual machine, as shown in FIG. 4, stored in the operating system; the virtual machine may include a communication port driver interface, communication port expansion unit, signal capture/forwarding unit and wireless communication unit.

The remote module 204 includes a second serial connection port 2042 and a second serial bus host controller 2044. The second serial connection port 2042 may be, for example, I$^2$C interface, USB interface, OTG interface, UART interface, RS-485 interface, RS-232 interface, etc. In the preferred embodiment, the second serial connection port 2042 is an UART interface, but it is not limited to such. In other words, the second serial connection port 2042 is coupled to the peripheral devices 70 via an UART interface. Those skilled in the art will appreciate that, without departing from the spirit of the invention, the second serial connection port 2042 may be changed to a parallel communication port. The second serial connection port 2042 and the second serial bus host controller 2044 may be stored in a processing and control module of the remote module 204. The processing and control module includes a microcontroller unit (MCU); i.e., the second serial connection port 2042 and the second serial bus host controller 2044 are controlled by the MCU.

The data forwarding module 206 is used to convert the first signal S1 to the second signal S2. In one embodiment, the data forwarding module 206 is stored in a memory of the electronic device 30 and controlled by the processing and control module of the electronic device 30. For example, the data forwarding module 206 may be a computer useable medium storing computer executable programs. In another preferred embodiment, the data forwarding module 206 is a separate signal converter, having one end coupled to the electronic device via a USB interface, and another end coupled to the wireless communication module 208 via an OTG interface.

When the electronic device 30 performs enumeration with multiple peripheral devices 70, each peripheral device 70 establishes its respective communication port on the electronic device 30 via the expansion module 207. The expansion module 207 has the function of a host controller, such as USB host controller, RS232 host controller, I2C host controller, etc. It cooperates with the peripheral devices 70 to establish the COM ports on the electronic device 30.

The second serial bus host controller 2044 is used to receive the second signal S2, and to transmit it to one of the peripheral devices 70. The second serial bus host controller includes a USB host controller.

In one embodiment, the wireless communication module 208, the expansion module 207 and the data forwarding module 206 are integrated into one unit or device. In another embodiment, the wireless communication module 208, the expansion module 207 and the data forwarding module 206 are separate devices, and are together coupled between the local module 202 and the remote module 204. The functions of the wireless communication module 208 include: to provide at least two signal channels, one for transmitting parameters and/or commands, such as HID control, and the other for transmitting data, such as HID data.

Refer to FIG. 4, which illustrates a computer useable medium of the electronic device 30 implementing communication port expansion according to a third preferred embodiment of the present invention. The computer useable medium includes a virtual machine 32, executed in the operating system (OS) 31 of the electronic device 30. The virtual machine 32 includes a communication port driver interface 322, a communication port expansion unit 324, a signal capture/forwarding unit 326 and a wireless communication unit 328. In one embodiment, the wireless communication unit 328 includes a Bluetooth interface, for coupling to a Bluetooth transmitter (signal transmitter) 330.

The communication port driver interface 322 may be embedded in the electronic device 30, or it may be installed using an external optical disc or commands. The functions of the communication port driver interface 322 include: to automatically recognize and detect peripheral devices (not shown in FIG. 4). The communication port expansion unit 324 is coupled to the communication port driver interface 322. The multiple peripheral devices establish their respective communication ports on the electronic device 30 via the communication port expansion unit 324. The signal capture/forwarding unit 326 is coupled to the communication port expansion unit 324, and the wireless communication unit 328 is coupled to the signal capture/forwarding unit 326. The functions of the signal capture/forwarding unit 326 include: To convert the first signal S1 to and from the second signal S2. The first signal S1 may be commands or parameters inputted by the operator using the input devices (e.g. keyboard) of the electronic device 30. It is converted to the second signal S2 by the signal capture/forwarding unit 326. The wireless communication unit 328 provides at least two signal channels, for transmitting the second signal S2 to the corresponding peripheral device via the external Bluetooth transmitter 330. The system 300 of this embodiment may be implemented as software, and the operator can use the system 300 to remotely control peripheral devices of electronic equipment.

Figure 5:
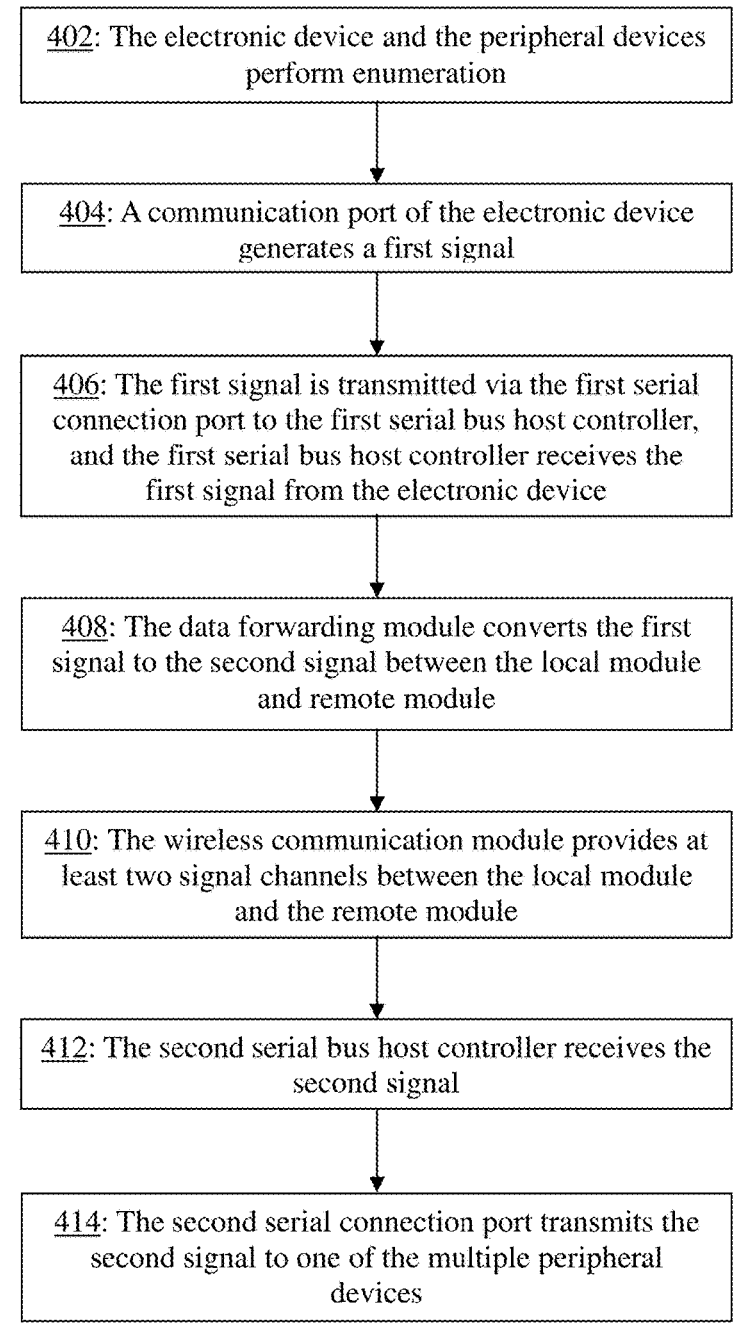
FIG. 5 illustrates a process flow of a fourth embodiment of the present invention.

Refer to FIG. 5, which illustrates a process flow for achieving serial communication expansion according to embodiments of the present invention, and also refer to the devices shown in FIGS. 1 to 4. The illustrated process flow show exemplary steps. Although the steps are shown as having a specific order, the order of the steps may be varied unless otherwise stated. Thus, the illustrated process flow is exemplary only, and the steps can be executed in different orders, and some steps may be executed simultaneously. Further, each execution of the flow may not include the same steps, so some embodiments may omit one or more steps. Other process flows are also within the scope of this invention. The method 400 may be performed by the device 100, the system 200 or the system 300. The descriptions below mainly use the system 200 to explain the process steps; when needed, the components of the device 100 or system 300 may be used to perform the process.

Step 402: The electronic device 30 and the peripheral devices 70 perform enumeration. In this step, each peripheral device 70 establishes its corresponding communication port on the electronic device 30 via the expansion module 207. For example, the three peripheral devices 70 shown in FIG. 2, via enumeration confirmation and the expansion module 207, respectively establish COM1, COM2 and COM3 shown on the user operation interface of the electronic device 30. In another embodiment, the electronic device 30 includes communication port driver interface 322 and communication port expansion unit 324, and the step 402 is accomplished by the communication port driver interface 322 and the communication port expansion unit 324.

Step 404: A communication port of the electronic device 30 generates a first signal S1, which may be commands or parameters inputted by the operator using the keyboard or mouse. More specifically, the communication ports established by peripheral devices 70 in step 402 enable the operator to separately set data flow parameters for different peripheral devices 70, which is the respective first signal S1. In other words, each communication port of the electronic device 30 generates its respective first signal S1.

Step 406: The first signal S1 is transmitted via the first serial connection port 2022 to the first serial bus host controller 2024, and the first serial bus host controller 2024 receives the first signal S1 from the electronic device 30. It should be understood that the first signal S1 is compatible with the communication interface of the first serial connection port 2022. For example, if the first serial connection port 2022 is USB, the first signal S1 should be serial digital signal.

Step 408: The data forwarding module 206 converts the first signal S1 to the second signal S2 between the local module 202 and remote module 204. The first serial bus host controller 2024 transmits the first signal S1 it received in step 406 to the data forwarding module 206. The data forwarding module 206 converts the first signal S1 to the second signal S2. For example but without limitation, it converts the first signal S1 which is a serial digital signal to the second signal S2 which is a wireless digital signal.

Step 410: The wireless communication module 208 provides at least two signal channels between the local module 202 and the remote module 204, one channel for transmitting parameters and/or commands, such as HID control, and the other for transmitting data, such as HID data. In one embodiment, the wireless communication module 208 includes Bluetooth interface, ZigBee, etc., but they are not limited to such.

In one embodiment, the local module 202 and the remote module 204 may be connected by a cable (e.g. optical cable, twisted pair, etc., not shown in the drawings), so step 410 is not necessary. Further, step 408 and step 410 may be performed simultaneously in parallel, or performed independently.

Step 412: The second serial bus host controller 2044 receives the second signal S2. The signal S2, which has been converted in step 410, is transmitted to the second serial connection port 2042.

Step 414: The second serial connection port 2042 transmits the second signal S2 to one of the multiple peripheral devices 70. The second signal S2 is compatible with the communication interface of the second serial connection port 2042. Step 412 and step 414 may be performed simultaneously in parallel, or performed independently.

In summary, multiple peripheral devices can, by using the expansion module (or expansion unit) of embodiments of the present invention, establish their respective communication ports on the electronic device. Further, the conversion module (or conversion unit) can convert between the first signal and second signal which are for different communication interfaces. This way, the operator can use each communication port displayed on the user operation interface of the electronic device, to adjust the data flow parameters for the peripheral device corresponding to each communication port. Thus, embodiments of the present invention can expand serial communication ports, and can support parameter setting for different peripheral devices individually, to control the remote electronic equipment.

The descriptions above are provided for explanatory purposes, and the various specific details are provided for a thorough understanding of the invention. Those skilled in the relevant art will be able to implement this invention without certain specific details. In other embodiment, some well-known structures and devices are not shown in the block diagrams. Between various elements shown in the drawings, intermediate structures may be present. The various described elements may include additional inputs and outputs, even though they are not shown in detail in the drawings.

In the various embodiments, certain elements are shown as separate circuits, but some or all elements may be integrated into one circuit. Thus, each of the various elements recited in the appended claims may correspond to one or more circuits.

Embodiments of the present invention include various processing programs, which may be embedded in hard drives or other computer readable memory and executed by processors. The processors may be general or special purpose processors or logic circuit that can execute program instructions, which execute the programs. The various components of the embodiments may also be combinations of hardware and software. The various modules, devices, or assemblies describe here may include hardware, software or their combinations. The modules described in the embodiments may include software, software data, commands and/or configurations, and can be implemented by the described mechanisms, electronics and hardware. Other aspects of the present invention provide computer program products, including a computer usable non-transitory medium having a computer readable program code embedded therein, where the program can be executed by processors or other electronic components to perform the methods described above. The computer usable non-transitory medium may include, without limitation, magnetic disks, optical discs, CD-ROMs, ROMs, RAMs, EPROMs, EEPROMs, magnetic memory, optical card, flash memory, or other computer usable medium suitable for writing and reading programs. Further, the computer program products according to embodiments of the present invention may also be downloadable programs which may be transmitted from a remote computer to a specified computer.

In the various methods described above, steps or information may be added or removed without departing from the spirit of the invention. Those skilled in the art can further improve the various embodiments. The embodiments described above are for explanation only and are not limiting.

In the above descriptions, when it is said that "component A is connected (or coupled) to component B", component A may be directly connected (or coupled) to B, or indirectly connected (or coupled) to B via component C. When it is said that a component, characteristics, structure, process or property A causes a component, characteristics, structure, process or property B, it is meant that A is at least a part of the cause of B, and other component, characteristics, structure, process or property may also help to cause B. When the word "may" is used, the component, characteristics, structure, process or property is not limited to what is described. Further, the number of various items describes in the specification is not limited to one.

It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A serial communication expansion device, comprising:
   a first serial connection port, for transmitting a first signal;
   a second serial connection port, for transmitting a second signal; and
   a processing and control module, coupled between the first serial connection port and the second serial connection port, the processing and control module comprising:
      a first serial bus host controller, coupled to the first serial connection port;
      a second serial bus host controller, coupled to the second serial connection port;
      a data forwarding unit, coupled between the first and second serial bus host controllers, for converting between the first signal and the second signal; and
      an expansion unit, coupled between the first and second serial bus host controllers, wherein the expansion unit is a communication host controller.

2. The serial communication expansion device of claim 1, further comprising a wireless communication unit for providing at least two signal channels, wherein the wireless communication unit includes a Bluetooth communication interface, the first serial connection port includes a Universal Serial Bus (USB) interface, and the second serial connection port includes a Universal Asynchronous Receiver/Transmitter (UART) interface.

3. The serial communication expansion device of claim 1, wherein the first serial connection port is a USB port, and the second serial connection port is an RS-232 port.

4. The serial communication expansion device of claim 1, wherein the first serial connection port is a USB port, and the second serial connection port is a USB On-The-Go (OTG) port.

5. The serial communication expansion device of claim 1, wherein the first serial connection port is configured to be coupled an electronic device and the second serial connection port, configured to be coupled to multiple peripheral devices, wherein the expansion unit is configured to cooperate with the multiple peripheral devices to establish their respective communication ports on the electronic device.

6. A serial communication expansion system, comprising:
a local module, comprising:
  a first serial connection port, configured to be coupled to an electronic device; and
  a first serial bus host controller, for receiving a first signal from the first serial connection port;
a data forwarding module, coupled to the local module, for converting the first signal to a second signal;
an expansion module, coupled to the local module;
a wireless communication module, coupled to the local module, for providing at least two signal channels; and
a remote module, coupled to the local module, comprising:
  a second serial connection port, configured to be coupled to multiple peripheral devices; and
  a second serial bus host controller, for receiving the second signal and transmitting it to the second serial connection port;
wherein the expansion module is configured to cooperate with the multiple peripheral devices to establish their respective communication ports on the electronic device.

7. The serial communication expansion system of claim 6, wherein
the local module includes a Universal Serial Bus (USB) interface for coupling to the electronic device, and
the remote module includes a Universal Asynchronous Receiver/Transmitter (UART) interface for coupling to the peripheral devices.

8. The serial communication expansion system of claim 6, wherein the first serial connection port is a USB port, and the second serial connection port is an RS-232 port.

9. The serial communication expansion system of claim 6, wherein the first serial connection port is a USB port, and the second serial connection port is a USB On-The-Go (OTG) port.

10. The serial communication expansion system of claim 6, wherein the local module and the remote module are connected to each other by an optical cable or a twisted pair cable.

11. The serial communication expansion system of claim 6, wherein the wireless communication module is a Bluetooth communication interface.

12. A communication expansion system in an electronic device, the system including a virtual machine, which comprises:
a communication port driver interface for automatically recognizing and detecting peripheral devices;
a communication port expansion unit, coupled to the communication port driver interface;
a signal capture/forwarding unit, coupled to the communication port expansion unit, for converting between a first signal and a second signal which are compatible with different communication interfaces; and
a wireless communication unit, coupled to the signal capture/forwarding unit.

13. The communication expansion system of claim 12, further comprising a signal transmitter coupled to the wireless communication unit to receive the second signal, configured to be connected to multiple peripheral devices, and wherein the communication port expansion unit is configured to cooperate with the multiple peripheral devices to establish their respective communication ports on the electronic device.

14. The communication expansion system of claim 12, wherein the communication port driver interface includes a Universal Serial Bus (USB) interface, and the wireless communication unit includes a Bluetooth communication interface.

15. A method for expanding serial communication between a local module and a remote module, wherein the local module is coupled to an electronic device and includes a first serial bus host controller, the remote module is coupled to multiple peripheral devices and includes a second serial bus host controller, the method comprising:
the electronic device and the multiple peripheral devices performing enumeration via an expansion module, wherein each of the multiple peripheral devices establishes a respective communication port on the electronic device;
the first serial bus host controller receiving a first signal from the electronic device;
a data forwarding module coupled between the local module and the remote module converting the first signal to a second signal, wherein the first signal and the second signal are compatible with different communication interfaces;
a wireless communication unit providing at least two signal channels between the local module and the remote module;
the second serial bus host controller receiving the second signal; and
the remote module transmitting the second signal to one of the multiple peripheral devices.

16. The method for expanding serial communication of claim 15, wherein one of the communication ports of the electronic device generates the first signal and transmits it to the first serial bus host controller.

17. The method for expanding serial communication of claim 15, wherein
the local module is coupled to the electronic device by a Universal Serial Bus (USB) interface, and
the remote module is coupled to the peripheral devices by Universal Asynchronous Receiver/Transmitter (UART) interfaces.

18. The method for expanding serial communication of claim 15, wherein the wireless communication unit includes a Bluetooth communication interface.

19. The method for expanding serial communication of claim 15, wherein the expansion module is connected between the first serial bus host controller and the second serial bus host controller.

* * * * *